United States Patent
Lehtonen et al.

(10) Patent No.: US 6,500,308 B1
(45) Date of Patent: Dec. 31, 2002

(54) METHOD FOR COATING A PRESS OR TRANSFER BELT AND A CORRESPONDING COATED BELT

(75) Inventors: Pentti Lehtonen, Jyväskylä (FI); Marko Kovanen, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/582,738

(22) PCT Filed: Jan. 4, 1999

(86) PCT No.: PCT/FI99/00001

§ 371 (c)(1), (2), (4) Date: Aug. 24, 2000

(87) PCT Pub. No.: WO99/35332

PCT Pub. Date: Jul. 15, 1999

(30) Foreign Application Priority Data

Jan. 2, 1998 (FI) .................................................. 980002

(51) Int. Cl.[7] .............................. D21F 3/00; B32B 27/04
(52) U.S. Cl. .................... 162/358.4; 162/306; 162/901; 427/179; 427/358; 427/412.4
(58) Field of Search .................................. 162/205, 306, 162/358.1, 358.2, 358.3, 358.4, 358.5, 359.1, 361, 900, 901, 902, 904; 139/383 A, 383 AA; 427/482, 133, 140, 172, 176–179, 209, 355–358, 412.4; 428/221, 58; 442/79, 82, 86, 88, 59; 118/218, 232, 322; 34/116

(56) References Cited

U.S. PATENT DOCUMENTS

| | | | |
|---|---|---|---|
| 4,552,620 A | * 11/1985 | Adams | 162/358 |
| 4,643,916 A | * 2/1987 | Kiuchi | 427/176 |
| 5,171,389 A | * 12/1992 | Stigberg | 156/165 |
| 5,208,087 A | * 5/1993 | Stigberg | 428/60 |
| 5,968,318 A | * 10/1999 | Hasegawa et al. | 162/358.4 |

FOREIGN PATENT DOCUMENTS

EP 0 487 477 * 5/1992 ............ B05D/5/02

* cited by examiner

*Primary Examiner*—Steven P. Griffin
*Assistant Examiner*—Eric Hug
(74) *Attorney, Agent, or Firm*—Fildes & Outland, P.C.

(57) ABSTRACT

A coated press or transfer belt and method for coating a press or transfer belt is disclosed, wherein a coating of one or more polymers and possible blend components and additives is formed on the surface of the belt. Coating is carried out by rotational molding, which is, as such known, onto the belt rotating on one or more rolls from at least two rapidly reacting liquid components. The set coating layer is then ground to an even thickness.

14 Claims, 1 Drawing Sheet

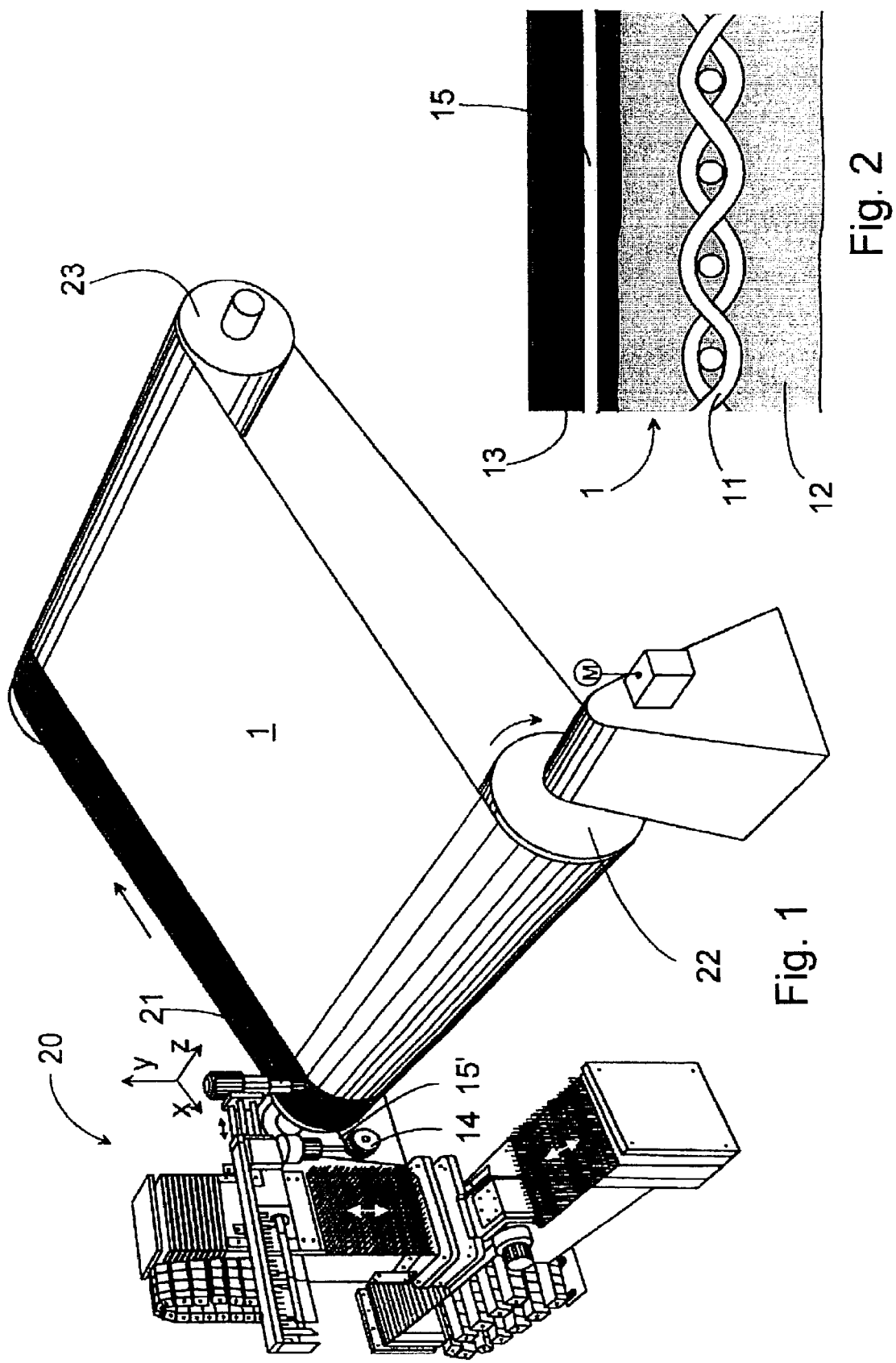

METHOD FOR COATING A PRESS OR TRANSFER BELT AND A CORRESPONDING COATED BELT

TECHNICAL FIELD

The present invention relates to a method for coating a press or transfer belt, in which a coat is formed on the surface of the belt comprising one or several polymers and possible blend components and additives. The invention also relates to a corresponding coated belt. In particular, the invention relates to press or transfer belts in a paper machine.

BACKGROUND OF THE INVENTION

Various kinds of press and transfer belts used in a paper machine are known from paper publications EP 509 460 (Yamauchi Corp.), EP 786 550 (Conrad Munzinger & Cie. AG), EP 576115 (Albany International), and WO 95/34715. Generally, a belt of this type comprises a woven supporting structure and a polyurethane matrix. The seam in the belt is often a nuisance in papermaking. In the first publication referred to, the seam is avoided by means of a construction, in which a narrow strip soaked in polyurethane elastomer runs in an endless spiral to form a belt without a transverse seam. In belts with transverse seams, the effect of the seam becomes emphasized or appears as the belt wears.

SUMMARY OF THE INVENTION

The present invention is intended to create a method for coating a press or transfer belt and creating a coated belt, by means of which the life of the belt can be lengthened and/or its characteristics improved. By means of the invention a coating is applied to the surface of a worn, scratched and/or otherwise damaged belt to restore its characteristics, or if it is wished to provide the belt with new surface characteristics.

The optimal properties for a belt in different applications are achieved through the selection of different materials. The relevant properties are hardness, density, and filler contents. From the point of view of a long service life, the most important characteristics of these properties are their homogeneity and especially their profiles in all directions, i.e. in the x, y, and z directions. With the aid of the invention, the belt is always seamless, which characteristic is retained even when the belt becomes thinner through wear.

According to one preferred embodiment of the invention, the basic polymer chains of one or more components of the coating are modified with halogenated macro-oligomers, diols, triols, thiols and/or other polyols. In the most preferable modification the halogen used is fluor, but iodine or bromine may also be used. Halogen treatment of this kind, in which the basic polymer of the coating itself is modified, is considerably more effective that the traditional treatment of the surface with a substance containing halogen particles.

The coating of a belt is intended to restore the original good characteristics of the belt or to improve the characteristics of the belt in its current application. The homogeneity of the coating is a particularly important property.

The invention is next described with reference to the accompanying figures, which illustrate some embodiments of the invention.

BRIEF DESCRIPTION OF THE DRAWINGS

FIG. 1 shows one belt being coated in a rotational moulding machine.

FIG. 2 shows a longitudinal cross-section of one coated belt.

DETAILED DESCRIPTION OF THE INVENTION

In FIG. 1, the belt being coated is marked with reference number 1. The coating is formed on top of belt 1 by rotational moulding. Belt 1 is set to rotate on two rolls, 22 and 23.

Cambered rolls, spreader rolls, and guides can be used to support and guide the belt.

The moulding equipment is shown generally by the reference number 20. The moulding equipment comprises a moulding head 21, through which quick-setting polymer is directed onto belt 1. The polymer comprises two or more polymer components, which react mutually. The setting to cohesion level is 1–60 seconds, depending on the length of the belt. The nozzle of the moulding head 21 is positioned by movements within the three-dimensional co-ordinates X, Y, and Z. The liquid polymer flows onto the belt 1 through the nozzle of the moulding head 21. Moulding head 21 is moved at a certain speed, depending on the length of belt 1 and the width of the run. In this way, belt 1 becomes coated with spirally spread polymer.

Moulding head 21 is located at the start of the straight run, so that the run that is initially in a liquid state is not disturbed by a centrifugal force. The setting speed is adapted to individual cases. From one rotation to the next, the new run is guided next to and partly on top of the previous one. However, the coating polymer is still in such a reactive state that the adjacent runs adhere homogeneously to each other.

It is preferable to lay reinforcing fibre 15', which runs off spool 14, in the bottom layer. The spool travels in the same line as moulding head 21. At least the top layer is formed without reinforcing fibre, allowing it to be used in its entirety as a wearing layer. All fibres used in rubberizing are suitable as reinforcing fibres, with polyester, polyamide and other textile fibres being used in place of a special reinforcing fibre (e.g. glass fibre).

Besides a spiral construction, the run may be full-width or the belt may be covered with several adjacent strips.

The cross-section in FIG. 2 shows the construction of the belt. If desired, the belt may be given an asymmetrical coating, so that there is an abundant wearing surface. In FIG. 2, the belt is marked with the reference number 1. The original belt 1 comprises a flexible layer 12 formed around a supporting fabric 11. The coating 13 is attached to the worn flexible layer 12. There may be also one or more coating layers. In the bottom layer, there are preferably reinforcing fibres 15, which will increase the strength of the entire belt. The total thickness of the finished belt is 1–8 mm, preferably 4–6 mm.

After rotation moulding and the setting of the coating, the belt is ground to an even thickness. In individual cases, the belt may be grooved or blind holes can be formed in the surface. Other further treatment can also be applied.

An extensive explanation of the chemistry of the coating appears in e.g. FI Patent 92419. The matrix structure of the coating used on a roll and the components of the additives can also be applied to the coatings of belts.

The aforementioned modification of the base polymer is made to one or more components, before they are mixed for rotational moulding. The modification is based on the reaction of the ends of the reactive polymer chains of the macro-oligomers with the molecules of the compound polymers. Modification artificially increases the halogen atoms of the polymer structure, which are then highly electronegative and reduce the surface energy of the coating. This in turn reduces the adhesion of paper fibres and dirt to the surface of the belt.

In coating, the possible matrix plastics are polyurethane and other flexible thermosetting plastics. Fillers include oxides, carbides, and sulphate.

The coating according to the invention is especially homogeneous in every direction. The proportion of blend components and/or additives in each tenth of the thickness of the coating deviates by a maximum of ± 2% from the target value. This structural property is provided precisely by rotational moulding, in which a rapidly setting moulding mix is used.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method for coating a press or transfer belt, wherein a coating of one or more polymers and possible blend components and additives is formed on the surface of the belt, characterized in that coating is carried out by rotational molding onto the belt rotating on one or more rolls from at least two rapidly reacting liquid components, the setting time of which to cohesion level is in the range of 1–60 sec., that the set coating layer is ground to an even thickness, and to reduce the surface energy, the base polymer chains of one or more components are modified with at least one of halogenated macro-oligomers, diols, triols, thiols, and other polyols.

2. The method of claim 1, characterized in that the halogen used in the modification is fluorine.

3. The method of claim 1, characterized in that the rotational molding is carried out spirally.

4. The method of claim 3, characterized in that one or more reinforcing fibers are fed to the coating in connection with the rotational molding.

5. The method of claim 1, characterized in that the rotational molding is carried out in a single run over the entire width.

6. The method of claim 1, characterized in that the rotational molding is carried out in several adjacent strips.

7. The method of claim 1, characterized in that the thickness of the finished belt with its coating is in the range of 1–8 mm.

8. The method of claim 1, characterized in that the thickness of the finished belt with its coating is in the range of 4–6 mm.

9. A coated press or transfer belt, wherein a coating of one or more polymers and possible blend components and additives is formed on the surface of a worn, scratched, and/or otherwise damaged belt, characterized in that the coating with the blend components and additives is generally homogeneous in all directions, and its structural properties have been created by rotational molding using a rapidly setting casting mix.

10. The coated press or transfer belt of claim 9, characterized in that the content of the blend components and additives deviate from the target value by a maximum of 2%, in each tenth of thickness of the cross-section.

11. The coated press or transfer belt of claim 9, characterized in that at least one of said polymers of the coating are modified with halogen oligomers, so that the basic polymer chains contain halogen atoms.

12. The coated press or transfer belt of claim 9, characterized in that polyurethane is one of the polymers of the coating.

13. The coated press or transfer belt of claim 9, characterized in that there is at least one reinforcing fiber circulating spirally in the coating.

14. The coated press or transfer belt of claim 9, characterized in that the coating comprises at least two layers and at least the upper layer is without reinforcing fibers, thus forming a wearing layer.

* * * * *